US010074093B2

(12) United States Patent
Higgins et al.

(10) Patent No.: US 10,074,093 B2
(45) Date of Patent: Sep. 11, 2018

(54) SYSTEM AND METHOD FOR WORD-OF-MOUTH ADVERTISING

(75) Inventors: Christopher William Higgins, Portland, OR (US); Marc Davis, San Francisco, CA (US); Joseph O'Sullivan, Oakland, CA (US); Ronald Martinez, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1002 days.

(21) Appl. No.: 12/180,486

(22) Filed: Jul. 25, 2008

(65) Prior Publication Data

US 2009/0183112 A1    Jul. 16, 2009

Related U.S. Application Data

(63) Continuation of application No. 12/015,115, filed on Jan. 16, 2008.

(51) Int. Cl.
*G06Q 30/02* (2012.01)
*G06Q 50/00* (2012.01)

(52) U.S. Cl.
CPC ......... *G06Q 30/02* (2013.01); *G06Q 30/0225* (2013.01); *G06Q 30/0241* (2013.01); *G06Q 50/01* (2013.01)

(58) Field of Classification Search
CPC . G06Q 30/0241; G06Q 50/01; G06Q 30/0251
USPC .......................................................... 705/14
See application file for complete search history.

(56) References Cited

U.S. PATENT DOCUMENTS

| 5,446,891 A | 8/1995 | Kaplan et al. |
| 5,493,692 A | 2/1996 | Theimer et al. |
| 5,583,763 A | 12/1996 | Ateheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |

(Continued)

FOREIGN PATENT DOCUMENTS

| EP | 1362302 | 11/2003 |
| JP | 2002312559 | 10/2002 |

(Continued)

OTHER PUBLICATIONS

U.S. Appl. No. 11/593,668, filed Nov. 6, 2006 for Naaman, et al.

(Continued)

*Primary Examiner* — Jessica Lemieux
(74) *Attorney, Agent, or Firm* — James J. DeCarlo; Greenberg Traurig, LLP

(57) ABSTRACT

A system and method to facilitate word-of-mouth advertising and sales support associated with displayed media objects on distributed networks is described. The system provides one or more advocates to a network user accessing advertising of a brand, product, or service. One or more of the advocates may be socially related to the user. User interactions with the advocates are facilitated through a real-time communication network, follow-on commercial activity is tracked, and the value of word-of-mouth advocacy is captured and distributed.

9 Claims, 11 Drawing Sheets

(56) References Cited

U.S. PATENT DOCUMENTS

| | | |
|---|---|---|
| 5,835,087 A | 11/1998 | Herz |
| 5,903,848 A | 5/1999 | Takahashi |
| 5,920,854 A | 7/1999 | Kirsch et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,014,638 A | 11/2000 | Burge et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Smith et al. |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |

(56) References Cited

U.S. PATENT DOCUMENTS

| | | |
|---|---|---|
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgernstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1* | 5/2007 | Atazky et al. ........... 379/114.13 |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0073641 A1 | 10/2007 | Perry et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114607 A1* | 5/2008 | Amer-Yahia et al. ........... 705/1 |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |

(56) References Cited

U.S. PATENT DOCUMENTS

| | | |
|---|---|---|
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1 | 3/2009 | Jhanji |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0150501 A1 | 6/2009 | Davis et al. |
| 2009/0150507 A1 | 6/2009 | Davis et al. |
| 2009/0165051 A1 | 6/2009 | Armaly |
| 2009/0171939 A1 | 7/2009 | Athsani et al. |
| 2009/0177603 A1 | 7/2009 | Honisch |
| 2009/0187637 A1 | 7/2009 | Wu et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0216606 A1 | 8/2009 | Coffman et al. |
| 2009/0222302 A1 | 9/2009 | Higgins |
| 2009/0222303 A1 | 9/2009 | Higgins |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1 | 10/2009 | Janie et al. |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0063993 A1 | 3/2010 | Higgins et al. |
| 2010/0070368 A1 | 3/2010 | Choi et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0185642 A1 | 7/2010 | Higgins et al. |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 10-20070053090 | 5/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.

(56) References Cited

OTHER PUBLICATIONS

U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"DAVE.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks, Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 12/241,590, filed Sep. 30, 2008, Athsani.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.

(56) References Cited

OTHER PUBLICATIONS

Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York, NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/0, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.

Press Release, "Qualcomm Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode—URL Barcodes—practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwsIsm1CisJ:www.openu .acil/Personal_sites/tarnirtassa/Publications/hcm.
pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of

(56) References Cited

OTHER PUBLICATIONS the Fourth ACM/IEEE Joint Conference on Digital Libraries Global Reach and Diverse Impact: Tucson, Arizona, pp. 53-62.
Nair, R. et al. (Nov. 6-11, 2005). "Photo LOI: Browsing Multi-User Photo Collections," MM'05 Singapore, pp. 223-224.
0' Hare, N. et al. "Combination of Content Analysis and Context Features for Digital Photograph Rtrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
U.S. Patent Application File History for U.S. Appl. No. 12/041,054, Mar. 3, 2008.
U.S. Patent Application File History for U.S. Appl. No. 12/041,062, Mar. 3, 2008.
U.S. Patent Application File History for U.S. Appl. No. 12/041,088, Mar. 3, 2008.
U.S. Patent Application File History for U.S. Appl. No. 12/169,931, Jul. 9, 2008.
U.S. Patent Application File History for U.S. Appl. No. 12/170,025, Jul. 9, 2008.
U.S. Patent Application File History for U.S. Appl. No. 12/180,499, Jul. 25, 2008.

\* cited by examiner

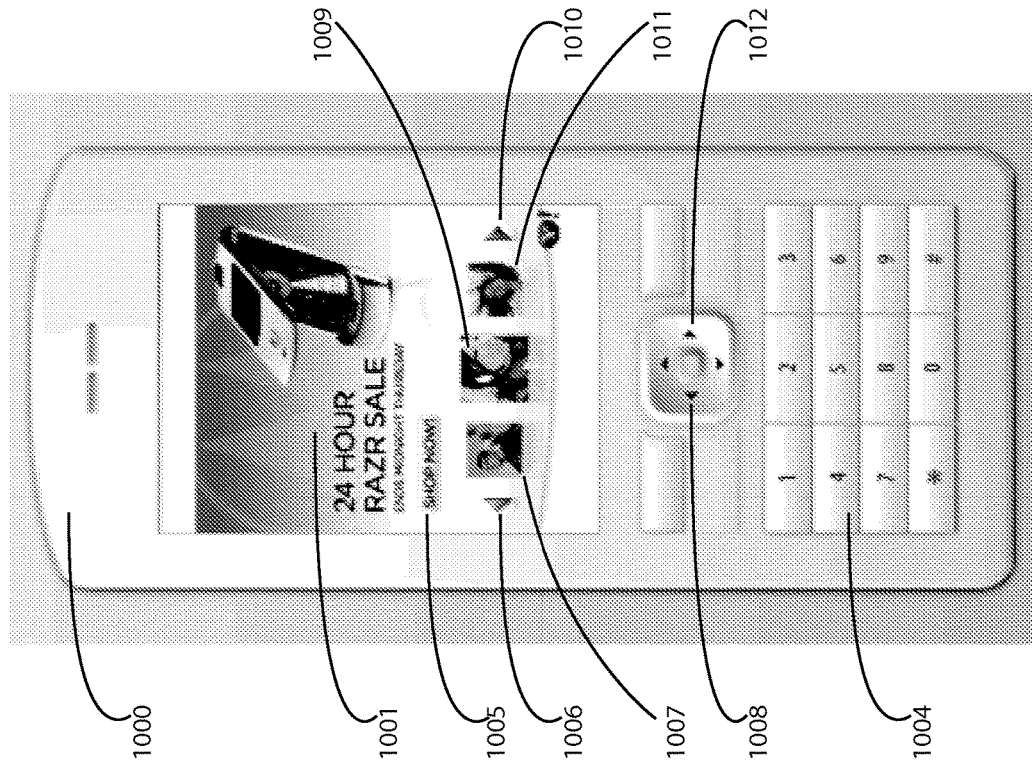
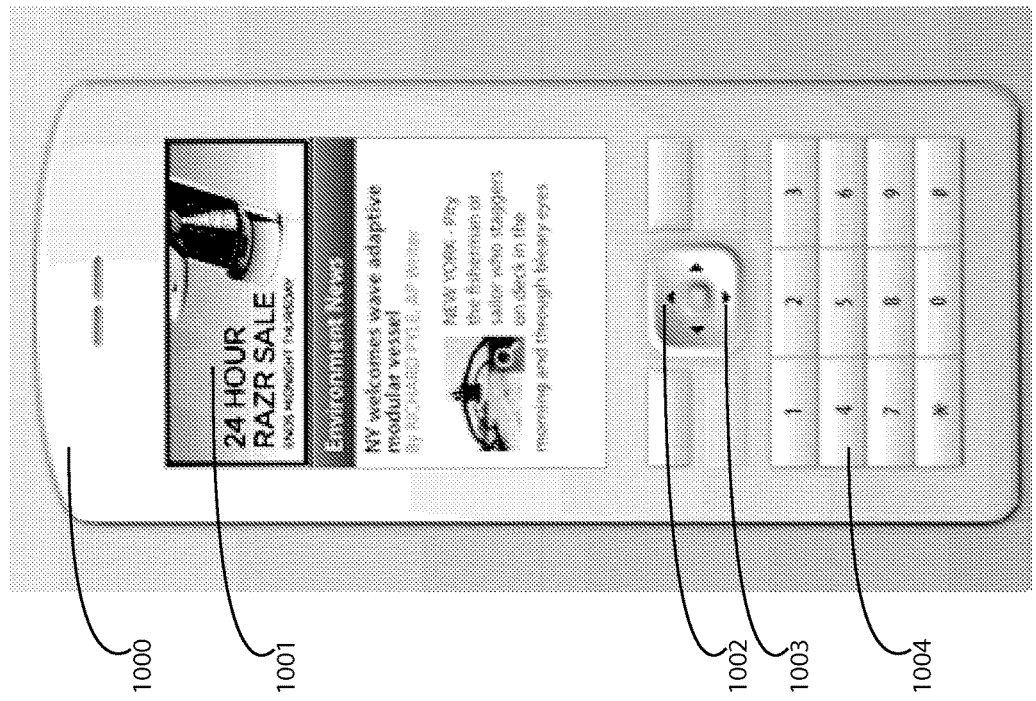
Fig. 10B
Fig. 10A

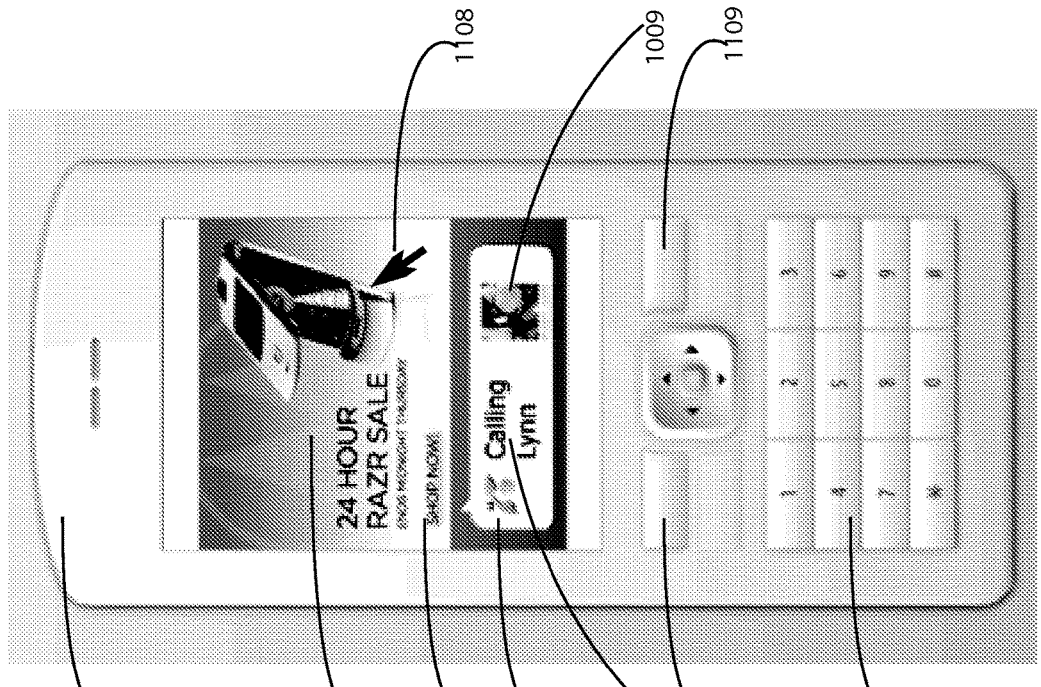
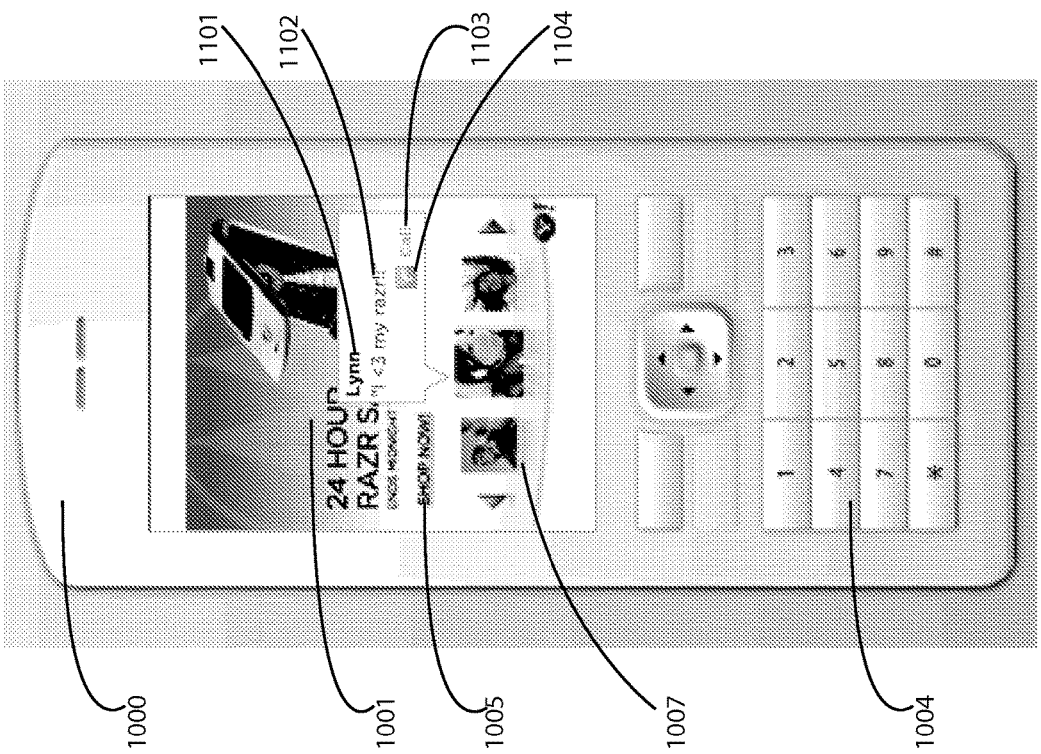
Fig. 11A
Fig. 11B

SYSTEM AND METHOD FOR WORD-OF-MOUTH ADVERTISING

CROSS REFERENCE TO RELATED APPLICATION(S)

This application is a continuation of co-pending U.S. patent application Ser. No. 12/015,115, filed on Jan. 16, 2008, entitled "System and Method for Word-of-Mouth Advertising", by Higgins et al.

TECHNICAL FIELD

The present disclosure relates generally to an online marketing system providing a consumer accessing content on the network with a set of network accessible users with connections to the marketed brands, products, or services, and possibly having a relation to the consumer.

BACKGROUND

At any point in time, there are literally millions of Internet users online and yet for most users the experience of using the Internet is a solitary, non-social activity. Although real-time communications channels such as the voice over internet protocol (VoIP), instant messaging (IM), and short message service (SMS) protocol are available, those systems do not allow object-specific, context-relative real-time communications directly associated with the object.

Likewise, the billions upon billions of media objects on the Internet exist in isolation unrelated to the users who may have created, consumed, commented on or are otherwise knowledgeable with regards to them. Although systems like bulletin boards or user groups exist to allow user interconnection related to specific subject matters, interests or media objects, those mediums are shifted in time. They do not present the media in any personalized or dynamic way to facilitate a real-time communication between users with the ease of one-click.

When users are doing commercial research or actually trying to purchase something online, this problem impedes efficient transactions and increases the number of unsatisfied customers due to a lack of real-time sales support to help them make happy and support efficient buying decisions. Although some businesses do offer real-time online sales support, it is not personalized, nor diversified, nor deployed in context on the web.

As means of communication improve, users of communication devices have an increased ability to consume, generate, and disseminate information, and to interact over the network through the sharing of information. In addition, the Internet has become a marketplace for goods and services offering wide selection at low prices. Despite these advantages, some consumers prefer the personalized experience of in-person sales and retain loyalty to so-called "brick and mortar" stores. Manufacturers, distributors, retailers, service providers, and advertisers seek improved means of marketing over the Internet and other networks.

Network marketing is not limited by a lack of available information; the Internet consumer is typically able to access a plethora of information available online. The digital information consumer perceives information conveyed over the network through various forms of media objects, including text, icons, voice, audio recordings, pictures, animations, videos, interactive widgets, and other audiovisual information. Descriptions of one or more forms of media objects may be combined in a data object, which the consumer accesses over the network. The data object may contain additional "metadata" information which is not typically observed by the consumer, but may instead define parameters useful in conveying information to the consumer, such as user identifiers, data locaters, data types, or data interpretation resources, as described below. Network users typically operate a physical device, such as a telephone, a text messenger, a cell phone, a smart phone, a personal digital assistant, a networked music/video player, a personal computer, or a public terminal, to interconnect with other users on the network. The network user typically utilizes a number of application programs to consume content on the network. Example application programs include a "media object player" and a "browser".

A browser is an application program that is generally intended to display "web pages." A web page is typically a two-dimensional image appearing as an individual page of information including one or more types of contained media objects. Multimedia content on the network appears in a virtual book format, which typically is displayed as an individually framed web page along with means for navigating to other related web pages. A web page may also be associated with audio output perceived by a page consumer. Data for web pages is often described in a format known as a Document Object Model (DOM).

Multimedia content may be directly perceived on a web page or may be indirectly accessible. Content on the page may be directly perceived by including one or more static media objects, such as a displayed image, or one or more dynamic media objects, such as a video in a media object player rendered within the image of the page. Examples of indirect access include access to an audio recording through background music, access through an auxiliary page or pop-up window, access through a sidebar or drawer attached to a window, access by invoking a menu item or toolbar, access provided through a link to another page, or access through an auxiliary program, such as a media object player. Two media object players are the Windows Media Player® available from Microsoft Corp. of Redmond, Wash. or the Apple QuickTime® player available from Apple Computer, Inc.

The source code for a media object or a web page may also contain one or more instances of script languages. ECMAScript is a script programming language, standardized by Ecma International of Geneva, Switzerland, in the ECMA-262 specification. JavaScript and Jscript are the most common implementations of the EMCAScript standard. "JavaScript" is a registered trademark of Sun Microsystems, Inc. of Santa Clara, Calif.; technology is further developed and implemented under license by the Mozilla Foundation of Mountain View, Calif. "JScript" is an ECMAScript implementation from Microsoft, Corporation. JavaScript and Jscript are often used for client-side interactive web applications.

When a consumer accesses a web page, script functions can interact with the Document Object Model (DOM) of the web page to perform one or more tasks. Scripts may also be used to make service requests to remote servers after a page has loaded. These requests can obtain new information or data, as well as load or launch additional applications, e.g., media object players, content viewers, application plug-ins, or software codes. Script code can merge with the DOM of the underlying page so that one or more additional media objects are displayed or otherwise rendered on the page. Alternatively, the script code may initiate one or more additional pages or other rendering for the additional media object(s). When script code is embedded into an HTML document and subsequently accessed by a client application, the client application may retrieve and execute the script. The script may initiate service requests to one or more remote servers to retrieve and render one or more media objects that enhance the underlying content of the page, optionally using parameter values assigned in the embed code. For example, the script, when executed, may access stored locally stored user preferences or user attributes stored in relation to the use of browser "cookies" and contain one or more user attributes in a dynamically generated service request.

When a media object is published on the network, scripts may be inserted in tags within the media object or within the published web page, and invoked when a consuming user accesses the web page or clicks on a link in the page. For example, a media object may be displayed in physical proximity with related advertising. The tags may additionally allow for various functions to be executed in association with the consumption of the advertising. For example, an Internet service provider (ISP) may use embedded tags to track the number of reactions of the consumer to the advertising associated with the media object.

Research has shown that some consumers prefer, and are more likely to be influenced by, marketing efforts provided by access to persons familiar with the marketed goods, brands, or services. In a brick and mortar store, consumers prefer retailers who provide individualized service, trustworthy knowledge, superior support, and easy access to quality goods. Some consumers prefer the social experience of personal interaction. Consumers are also heavily influenced by the consumption preferences of their social peers.

At this time, there is no simple way to access analogous marketing social functions over the Internet. A goal of the present invention is to augment network advertising and branding with a plethora of social network opportunities to further marketing goals.

SUMMARY

A service provider facilitates word-of-mouth advertising and sales support associated with displayed media objects on distributed networks. The system provides one or more advocates a network user accessing advertising of a brand, product, or service. One or more of the advocates may be socially related to user. User interactions with the advocates are facilitated through a real-time communication network, follow-on commercial activity is tracked, and the value of word-of-mouth advocacy is captured and distributed.

The present invention provides detailed methods, apparatuses and systems directed to interactive, word-of-mouth advocacy of consumption. In a particular implementation, a service provider facilitates social interaction with a group of advocates leading to the consumption of goods, brands, or services on the network. The service provider monitors access to network content objects, identifying marketing opportunities for advocacy. The opportunities are ranked, and one or more high ranking content objects are augmented with one or more advocates. A consumer is provided with one-click access to one or more live personalized advocates related to the consumer and the marketed goods, brands, or services.

BRIEF DESCRIPTION OF THE DRAWINGS

FIG. 10A-10B show two steps in social network advertising on a cell phone.

FIG. 11A-11B show two additional steps in social network advertising on a cell phone.

DETAILED DESCRIPTION

The following embodiments and aspects thereof are described and illustrated in conjunction with systems, apparatuses and methods meant to be exemplary and illustrative, not limiting in scope. In various embodiments, one or more of the above-described goals have been achieved.

The specification sets the framework by describing a typical network environment and user operation of the invention. Following that is a description of the algorithms employed and a network infrastructure to support the invention. Finally, an alternative environment and interface shows the general applicability and variations of the method.

Figure 1:
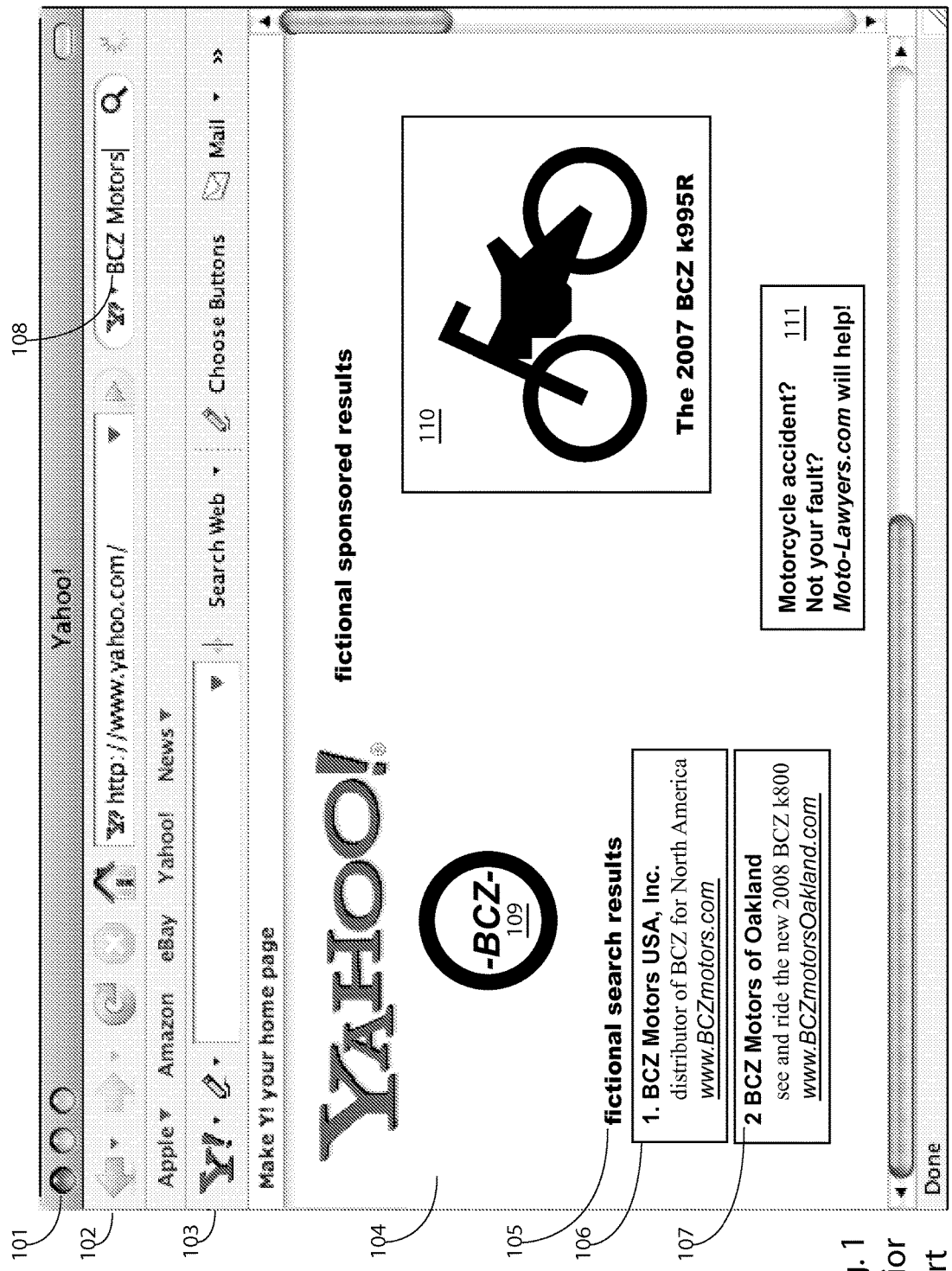
FIG. 1 is an example of a prior art user interface displaying a search result.

FIG. 1 illustrates a prior art browser window display using the Mozilla Firefox browser. A browser window, such as the one shown, is typically divided into one or more control areas and one or more content areas. The browser window contains typical control and display regions, such as title bar 101, browser control bar 102, Yahoo!® Tool bar 103, and a main window content area 104. Browser control 108 is an interface for a Yahoo!® search engine. In this hypothetical example, a consumer has entered the search phrase "BCZ Motors," the name of a fictitious motorcycle manufacturer. In response, the main window content area 104 displays fictitious results of the search request.

The area 105 contains the beginning of typical search results, with two line items 106-107 displayed. As used hereinafter, a "line item" is a listed element of a display associated with or linked to a different network location. Typically, the line item will contain an explanatory title, one or more excerpts of text from a web page, and a link connected to the uniform resource locater (URL) for the web site hosting the web page. In this fictitious example, line item 106 is a link to the website for the North American distributor for BCZ motorcycles, while line item 107 is a link to the website for a local BCZ motorcycle dealer. The invention may be used to augment various line items as described further below.

The hypothetical web page also contains three sponsored search results, which are typically advertisements for products, services, brands, or other web sites. A sponsor may be any party in a commercial supply chain, from manufacturer or service provider to consumer. A media object 109 consisting of a manufacturer logo is displayed as a sponsored advertisement with a goal to increase brand awareness. A media object 110, depicting a motorcycle, is an advertisement for a product. The media object may be a static object, such as an image or illustration, or it may be a dynamically changing object, such as a flash movie, an MPEG-4 video, or some other streaming audio/music video. A banner ad 111 advertises the services of a fictitious law group. The invention may also be used to augment various sponsored content objects, as described further below.

Figure 2:
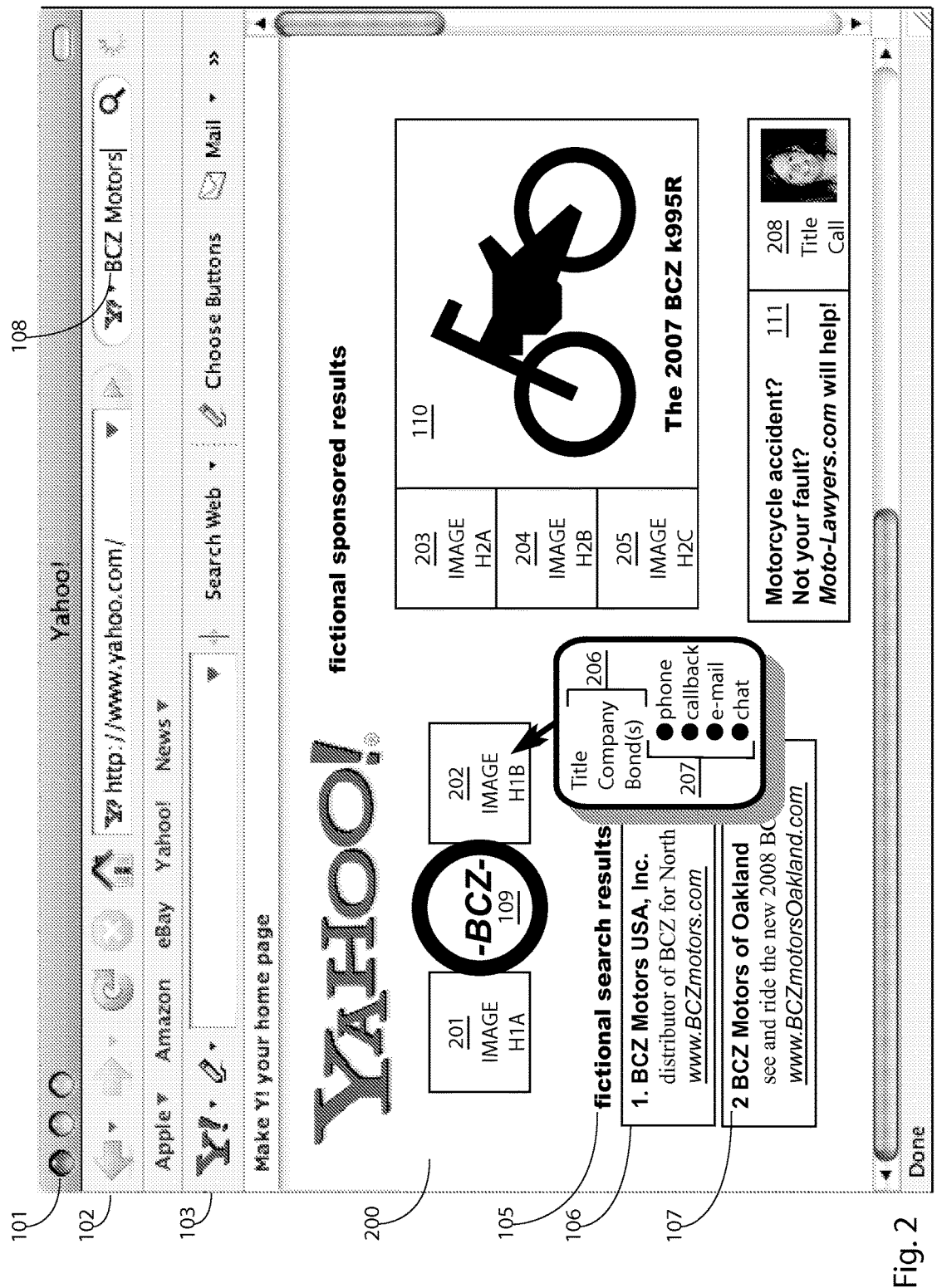
FIG. 2 shows an augmented display associating various items with social halos.
Figure 3:
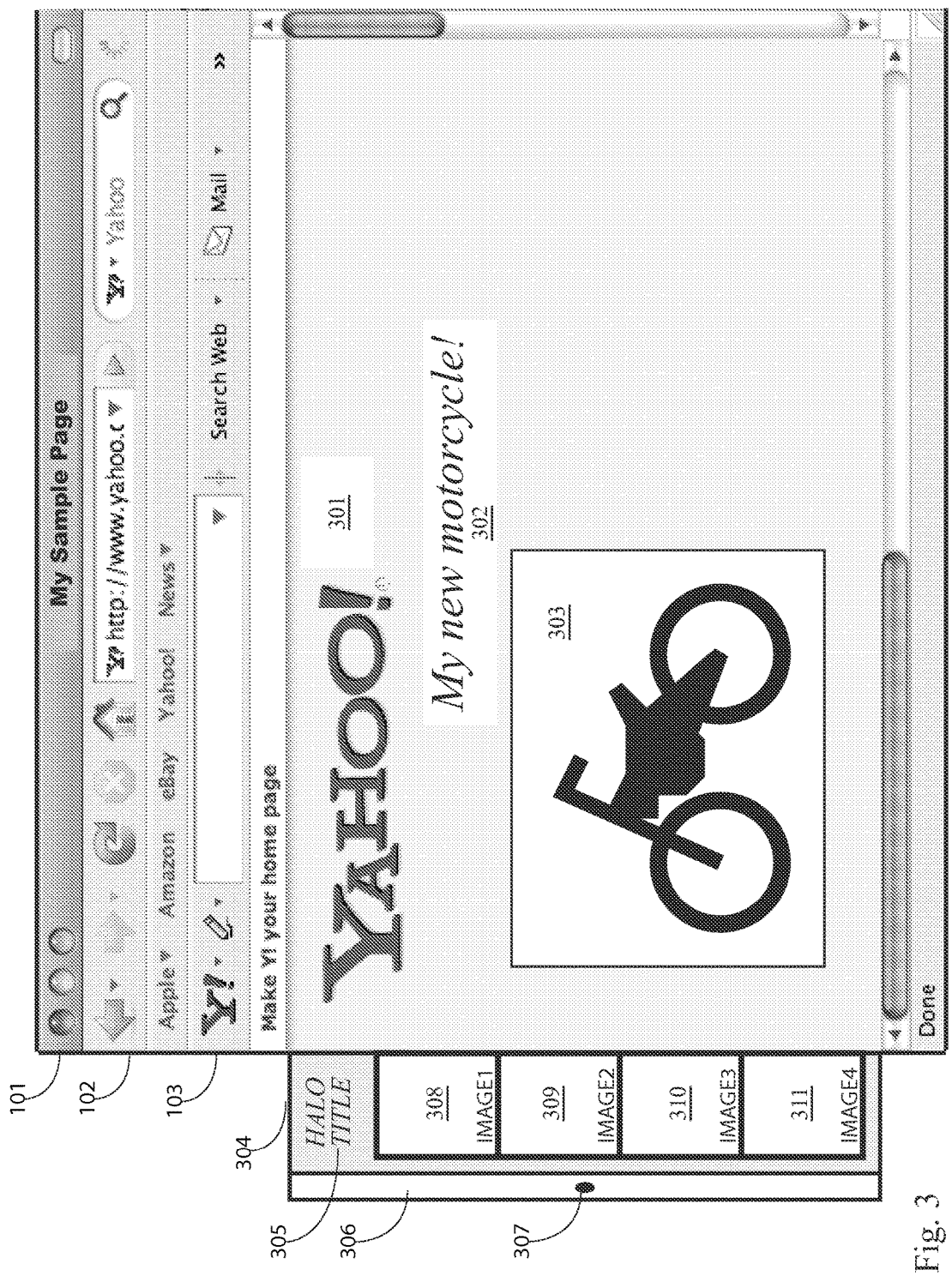
FIG. 3 shows an augmented display associating a web page with a halo.
Figure 4:
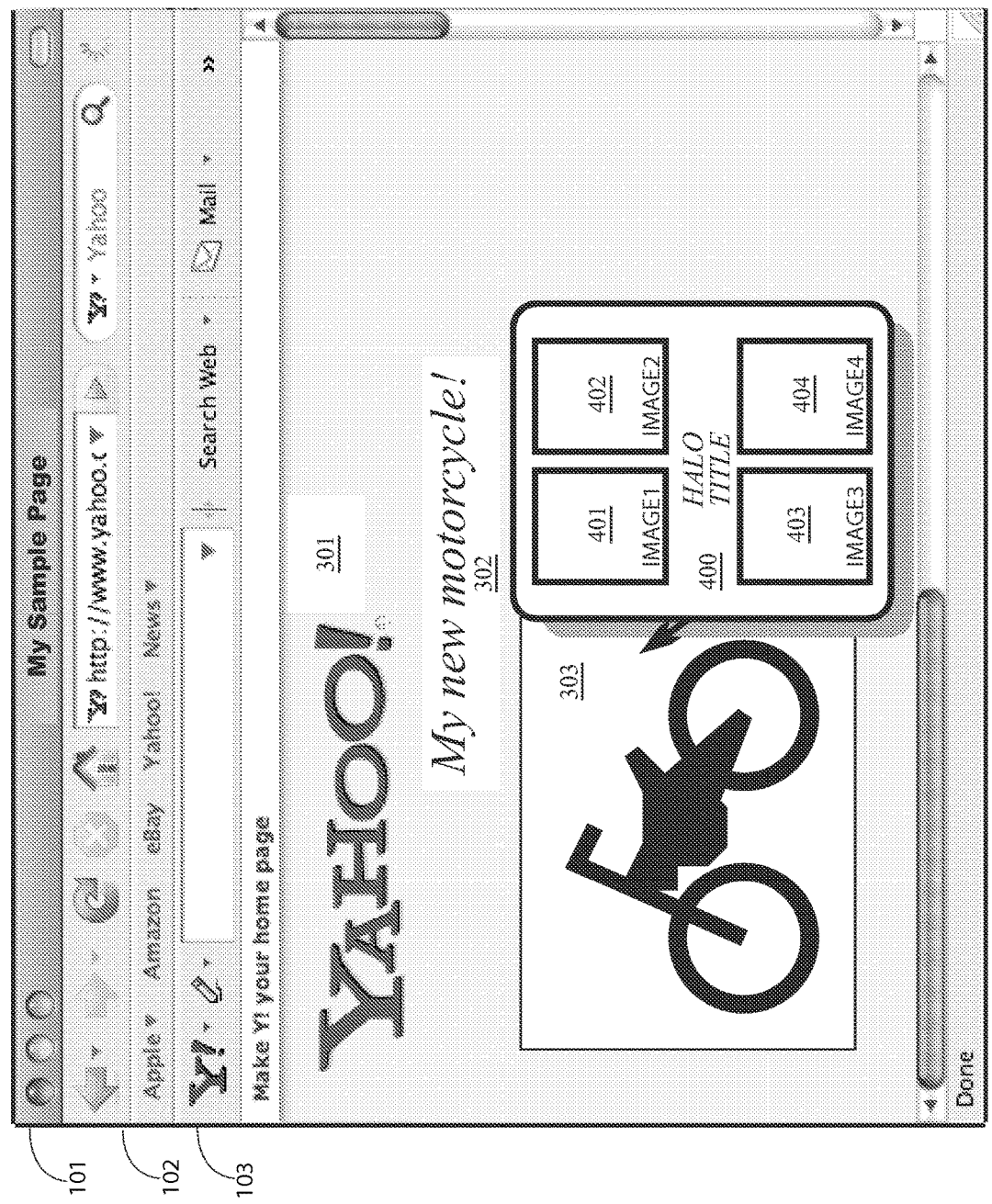
FIG. 4 illustrates associating a sub-page event with a halo.

Example prototypical environments for the invention are shown in FIGS. 2-4. Displayed content is augmented with one or more groups of available advertisers to promote goods, services, other web sites and/or brands. As used hereinafter, a halo of advertisers is a group of one or more advertisers associated with a common marketing theme.

Marketing or promotion themes are either supplied in source metadata or derived from the various environments, as explained further below. FIG. 2 illustrates an example where the three sponsored content objects of FIG. 1 are augmented in a modified page content area 200. Each sponsored or un-sponsored content object presents a new potential marketing theme, and the invention may be applied to an individual content object on a page as described further below. For illustration purposes only, and not by way of limitation, only the sponsored content objects are shown augmented in FIG. 2.

In FIG. 3, the content to be augmented is an entire web page. A single marketing theme is embedded in the metadata of the page or determined from the content of the page.

In FIG. 4, each media object contained within the page presents a new potential marketing theme. A consumer may dynamically access a group of advertisers associated with one or more sub-page events or themes. For example, a motorcycle distributor may provide a media object that any motorcycle rider may post on a personal webpage, consisting of an image of one of the distributor's products. The data for the media object includes metadata and or script function calls implementing a social halo connected with the distributor.

Although three prototypical environments are shown separately in FIGS. 2-4, the invention is applicable in combinations present within a web page. For example, a web page that contains L line items and M media objects may be augmented with zero to (L+M+1) marketing theme halos, one for each line item, one for each media object, and one for an overall page theme. The halos may be constantly visible, dynamically displayed, and/or dynamically generated.

In one implementation, representations of the one or more halos associated with a page are always visible as shown in the three example halos of FIG. 2. In one embodiment, a consumer may obtain additional information about a marketing agent by a consumer action, such as by touching the image of the agent on a touch-screen, or clicking/holding a computer mouse button with the active screen cursor over a marketing agent's image, or allowing the screen cursor to hover over a marketing agent's image. As known in the art, various interfaces support various consumer actions to select an image within a page.

In FIG. 2, an exaggerated cursor arrowhead hovers above image 202. As a result, a pop up window containing one or more items related to the marketing agent appears above the page content. In this example, one or more of the name of the marketing agent (title), the affiliation of the marketing agent (company), and the social bond between the marketing agent and the consumer (bonds) is shown in text area 206. For example, image 202 may be a picture of a local BCZ motorcycle rider and area 206 may indicate his name, that he is a BCZ rider, and that he lives in Oakland, the same location as the consumer. In addition, the pop-up window may indicate one or more means to communicate directly with the agent, as displayed in communication area 207. The communication area typically has a redundant indicator for each means of initiating a communication. In this example, the consumer may select a phone contact by selecting the text "phone" or clicking the associated icon (shown as a bullet in close proximity to "phone"). In a preferred implementation, a best means of communication, common to the consumer and marketing agent, is selected as a default means. In one embodiment, the consumer may override the selection in a pop-up menu, a set of user preferences, or via a pull-down menu or toolbar menu selection.

In a preferred embodiment, a consumer activation of any visible halo image results in a direct, live connection to the marketing agent using the default means of communication. As known in the art, consumer selection of an image within a screen display may be accomplished in an interface by detecting various consumer actions, such as a tap on the image of the agent on a touch-screen, or clicking/releasing (including double-clicking, option-clicking, and so on) a computer mouse button with the active screen cursor over a marketing agent's image.

In an additional embodiment, the halo of marketing agents may include one or more alternative agents. The motorcycle distributor, for example, may have a queue of available sales agents. In the event that a displayed agent goes offline or otherwise becomes unavailable, a replacement agent is ready. In a preferred embodiment, the image and information of the offline marketing agent is replaced by the image and information of the replacement agent. In a further embodiment, a failure to establish communication with a first marketing agent results in an attempt to establish communication with a first replacement agent, a failure to establish communication with a first replacement results in an attempt to establish communication with a second replacement agent, and so on, until the list of replacements is exhausted or communication is established. In an alternate embodiment, a failure to establish communication to an agent by a first selected means of communication results in an attempt to establish communication by a second best means of communication, and so on, until the list of means of communications is exhausted or communication is established. In one embodiment, a failure to establish communication to an agent results in an indication to the consumer that the agent is temporarily busy, and retries of the same communication means may be attempted. In an alternate embodiment, a failure to establish communication to an agent by a first selected means of communication results in an indication to the consumer of a variety of alternate contact means and/or alternative marketing agents, and allows the consumer to select the alternative desired.

Examples of agent communication means include, but are not limited to, telephone, cell phone, instant messaging, the short message service (SMS) protocol, voice over internet protocol (VoIP), video teleconferencing, e-mail, audio teleconferencing, and other computer, phone, smart phone, cell phone, personal digital assistant, satellite phones, and other telephonic means of communication.

In an alternate embodiment, the consumer may replace one or more marketing agents with an alternative agent. In one example implementation, the function of the pop-up window associated with the mouse hovering above image 202 may be different than that shown in FIG. 2. In this embodiment, a hovering cursor or other consumer action associated with image 202 brings up a pop-up menu of alternative agents for that slot, such as the pop-up bubble 400 of FIG. 4. The consumer may click and drag the mouse (or take some other selection action) to select one of the alternative agents. In one embodiment, when the consumer selects an alternative halo member, the image and information of the rejected marketing agent is replaced by the image and information of the replacement agent and results in transmission of information to track the popularity of halo members.

In another embodiment, the marketing agents are partitioned into categories and a replacement must come from within the same category. For example, a motorcycle distributor may specify that one agent in a two person halo is a sales agent, while the other is a service technician. If a sales agent (or service technician) goes offline or becomes busy, a replacement sales agent (or service technician) is selected. In one embodiment, one or more marketing agents are considered required agents, with one or more required attributes. The replacement of a required agent must have the same required attributes.

Three different methods of augmenting the user interface with available advertisers are also illustrated in FIGS. 2-4. The combinations shown are by way of example and not by way of limitation. In FIG. 2, company logo 109 is augmented with two marketing agents, H1A 201 and H1B 202, in a halo H1 embedded within the page and placed in close proximity to 109. Motorcycle advertisement 110 is augmented with three marketing agents, denoted H2A 203, H2B 204, and H2C 205 in a halo H2 in close proximity to 110. Banner ad 111 is augmented with a single marketing agent 208. Each of these three halos is shown embedded in the content of the page and visible in the page. In one implementation, one or more additional content objects may also be augmented with a halo which is only visible through activation by the user, such as by hovering or clicking/holding a computer mouse button with the active screen cursor over an object associated with a halo. This is illustrated in FIG. 4, as described further below.

In the user interface of FIG. 2, the embedded representations may be alternatively placed to the side of the augmented item, above or below the augmented item, or surrounding the augmented item, as long as the representations are embedded in the page content area of the page in close proximity to the augmented item.

FIG. 3, in a second example, shows a web page augmented with a halo of four advertisers, with images 308-311 embedded in a separate left drawer 304. The web page has a hypothetical content area 301 with a text phrase 302 ("My new motorcycle!") and displaying a media object 303 consisting of an image of a motorcycle. In this example, the halo with four advertisers is not embedded in the content of the augmented page, but is instead displayed in a separate area. The separate area may be a user interface known in the art as a left drawer (shown), a right drawer, a left or right sidebar, a bottom bar, a bottom drawer, a toolbar, a tear-off window, a pop-up window, a pop-up menu list, or in a separate tabbed window. The user may utilize optional control button 307 by clicking and dragging to the right to slide the drawer partially under the window or close it entirely. In one embodiment, the halo window may be dragged apart from the main window as a tear-off window. In one embodiment, a halo window has various controls to close, minimize, restore, resize, and/or scroll through a subset of visible members in the halo window. The halo window contains one or more images for the advertisers, such as examples 308-311, and may contain a title area 305 to display the halo theme. In addition, various advertiser text labels may be displayed (not shown). If the user desires to contact one of the advertisers in FIGS. 2-3, the consumer activates a selection of the advertiser's image, as described above. In an alternative implementation, the consumer may redundantly select the advertiser by selecting the advertiser's text label. In a further embodiment, the image and label of the advertiser may be combined in a single area, such as 208. In one implementation, title text and communication selection icons are placed on top of the advertiser's image (not shown).

The halo displays as shown in FIGS. 2-3 are static in the sense that the halo images remain on the screen when the page is displayed. An alternative example utilizes dynamic "floating" halos as shown in FIG. 4. In FIG. 4, the underlying page content 300 is the same as in the main window of FIG. 3. In FIG. 4, a browser user perceives a cursor location 401 that typically is moved with a mouse. In this example, the cursor location hovers above a media object 303 consisting of an image of a motorcycle.

In one embodiment, a user interface process monitors the amount of time the cursor is above the media object, and provides a floating halo window, such as halo 400 containing four advertisers 401-404, if the cursor remains above the media object beyond a time-out period. If the user desires to contact one of the advertisers, the user moves the cursor to the halo display and clicks a mouse button with the cursor location over the advertiser's image. In an alternate embodiment, the user initiates display of the floating halo window 400 by clicking on the media object and holding the mouse button down. As a result, the floating halo window 403 remains on display as long as the mouse button is held down. If the user desires to contact one of the advertisers, the user drags the cursor location over the advertiser and releases the mouse button. Other interfaces are possible. For example, on a touch screen a consumer may touch a media object to pop-up the associated halo, and drag the finger or stylus to the image of an advertiser for selection purposes. An advantage of this embodiment is that a distributor may show a larger number of products on a page when one or more halos are not displayed, and the consumer observes only those halos related to products of interest.

Although alternate interfaces are shown in FIGS. 2-4, the interfaces share some common features. By default, a marketing halo is shown in close proximity to the item, media object, or page content to be augmented. With one click or other consumer activation, a user can initiate immediate contact with an advertiser, as explained further below. Each halo of advertisers promotes a common marketing theme. Although only one interface is shown in each of FIGS. 2-4, the various halo interfaces may be combined in the display of a web page (not shown) or other display.

Figure 5:
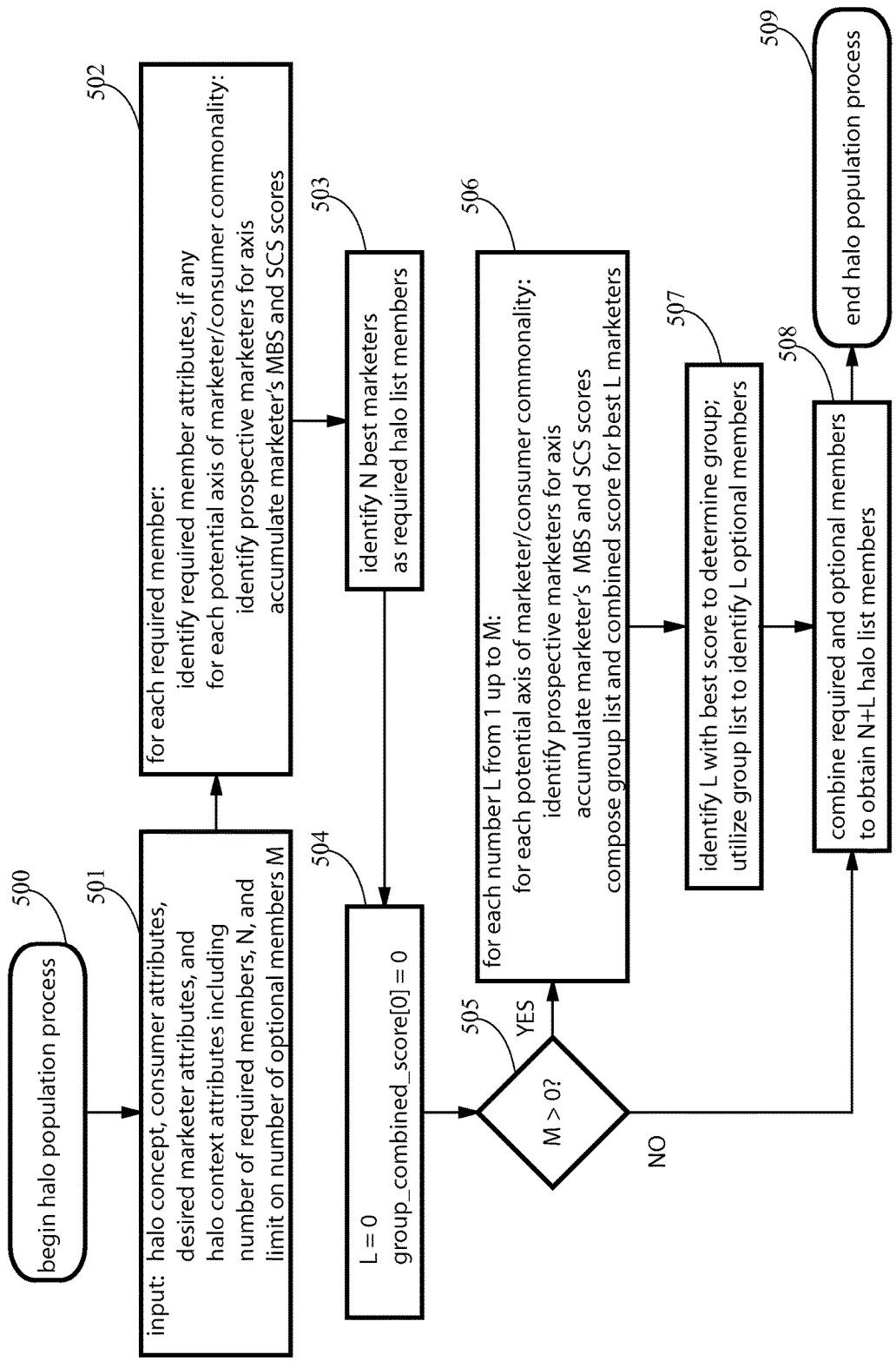
FIG. 5 is an example flowchart for a method of populating a single halo.

FIG. 5 is a flowchart showing an example halo population process, where a service provider determines the members of a halo organized around a marketing concept. The halo population process begins in step 500. In step 501, the marketing concept or theme, consumer attributes, the halo context, and desired advertiser attributes are input to the process. In this example process, the process also inputs a number of required halo members, N, and a limit on the number of optional halo members, M. In other embodiments, the number N or M may be determined dynamically.

Consumer attributes may include the age, sex, location, income, and other demographics of the consumer, expressed preferences of the consumer, and implied preferences of the consumer such as buying or browsing habits, and so on. In a preferred embodiment, a consumer-profiling server maintains a database of consumer attributes. A consumer may register with the consumer-profiling server to obtain an identifier and store one or more expressed attributes. Alternatively, a consumer-profiling server may assign user identifiers. In one implementation of the halo population process, a consumer identifier may be transmitted to the populating server, which is used to index the consumer attribute server to obtain the consumer attributes. In an alternative embodiment, external consumer profiling services may be used. In one embodiment, any consumer action related to a halo is tracked and used to adaptively modify consumer attributes. In addition, consumer browser habits may be tracked to estimate an expected time of purchase. For example, a motorcycle shopper typically first accesses a variety of web sites related to different brands of motorcycles, and gradually narrows his choice to concentrate on a limited number of brands and models, and, as the purchase approaches, the shopper is likely to be more interested in exact price and availability. By tracking the focus of the shopper, a service provider can estimate a time for the shopper's purchase.

In one embodiment, a service provider tracks and estimates the proper context of a halo. For example, in one embodiment the service provider tracks the position of the consumer in a purchasing timeline, and biases the selection of halo participants accordingly. The halo context may also include the intended type of display device or other display attributes, interface attributes, and desired halo characteristics, such as halo type, relative fulfillment of marketing goals, geographic limitations, age limitations, demographic targets, and so on. In one embodiment, a marketing deal identifier may be assigned, and a marketing-logging server tracks the fulfillment of various marketing deals. For example, a motorcycle distributor may be willing to pay for up to 1000 halo referrals to a sales agent, and the marketing deal may be registered in the marketing-logging server. Whenever a consumer action results in population of the related halo, the populating server receives the marketing deal identifier, accesses the marketing-logging server with the identifier as a deal index to check on the fulfillment of the marketing deal. While the goal remains unfulfilled, the selection of halo members may be biased in favor of sales agents.

In one embodiment, it may be specified that a halo has, for example, a population of N required (or specified) members and exactly M optional (or optionally specified) members. Alternatively, the halo may have a number of required members, N, determined as a default value, a preference value, or an embedded value contained in metadata for the DOM of the web page, and the process may determine one or more optional halo members, with an upper limit of M optional members. For example, a marketing plan for motorcycles may require at least three advertisers, and may allow for up to two additional advertisers. The marketing agency may further specify additional desired attributes. For example, a marketing agency may specify that of the three required advertisers, one is a motorcycle sales agent, one is a motorcycle service agent, and it is preferred but not necessary that the third is a local motorcycle dealer. In one implementation, a data object may be configured with metadata to specify one or more attributes of halo members.

Step 502 evaluates a pool of advertisers as potential required members of a halo. For each required member of the halo, the attributes of each member of a pool of advertisers are compared to a set of required advertiser attributes, and if member of the pool meets the qualifications, the member is considered a prospective advertiser. The set of prospective advertisers is processed to determine a degree of social connection with the consumer, which is assigned a social connection score (SCS) and a degree of marketing benefit, which is assigned a market benefit score (MBS).

Social connections may have multiple dimensions, and an axis is assigned for each dimension. For example, a consumer may feel a degree of social connection with an advertiser in a nearby geographic location. One potential axis of advertiser/consumer commonality is therefore geographic location. In one embodiment, the social connection score for geographic location may be inversely proportional to the estimated distance between the consumer and advertiser. A prospective advertiser who is nearer to the consumer achieves a higher score for a location axis. The various social connections to be considered may be embedded as metadata in the DOM for the web page, or may be assigned by default or user preferences. Examples of social connections may include ethnicity, age, sex, educational level, educational institutions, economic class, profession, geographic area, expressed or derived user preferences, and membership in various other demographic groups. A prospective advertiser may have more than one social connection with the consumer, and a score is assigned for each dimension. In one embodiment, the scores for various dimensions of advertiser/consumer connection are accumulated for each prospective advertiser to determine a combined SCS. In an alternate embodiment, the scores for various dimensions of advertiser/consumer connection are squared, and the squares of the scores are accumulated to determine a combined SCS.

At the same time, the subset of prospective members is processed to determine a degree of marketing benefit to the product, which is assigned a marketing benefit score (MBS). Marketing benefit may have multiple dimensions, and an axis is assigned for each dimension. For example, an advertiser may be evaluated in sub-categories including, but not limited to, knowledge of the product, product training, familiarity with the product or brand, attitude toward the product, image appeal, likeability, personality, fame, track record in selling the product, general marketing skills, and so on. For each applicable dimension, a potential marketing agent is assigned a marketing benefit score. In one embodiment, the scores for all included dimensions are accumulated to determine a combined MBS. In an alternate embodiment, the scores for included dimensions of marketing benefit are squared, and the squares of the scores are accumulated to obtain a combined MBS.

In step 503, the accumulated scores are processed to identify the Nbest scoring advertisers. In one implementation, an advertiser's overall score is proportional to the product of a social connection score and a marketing benefit score, $$SCORE = w*SCS*MBS,$$

where w is a constant of proportionality. An advantage of such a scoring system is that it results in a diverse source of marketing materials. A manufacturer's representative, for example, would likely have a relatively high marketing benefit score, which could overcome a relatively low social connection score. On the other hand, a close social connection of the consumer would likely have a high social connection score, which could overcome a relatively low marketing benefit score. In one implementation, prospective marketing agents who have a negative marketing benefit or marginal marketing benefit are not included. In one embodiment, the constant of proportionality is a product of K weighting factors, $$w = w[1]*w[2]* \ldots *w[K],$$

which account for various contextual factors. For example, an advertiser's marketing benefit score may be decreased or increased based upon a user preference rating by adjusting a weighting factor.

In step 503, the scores for various prospective advertisers are sorted to identify the N advertisers with the best scores. These advertisers are assigned as the N required halo members. Step 505 initializes an empty group of optional advertisers as having zero members and a score of zero. Step 505 checks if there is a possibility of identifying additional optional members. If so, step 505 proceeds to step 506.

In step 506, each number L of potential optional members in the range of one up to M is evaluated. Prospective advertisers are identified and assigned scores by accumulating MBS and SCS scores as above. Finally, a group satisfaction score is determined for each value of L. In one implementation, the group satisfaction score is proportional to the sum of the best L advertiser's scores divided by the total number of halo members. Although each additional member adds some social marketing score, there are diminishing value returns as the consumer becomes overwhelmed with a plethora of advertisers. The group satisfaction score accounts for these diminishing returns.

In step 507, the group satisfaction scores are compared to identify the value of L with the highest group satisfaction score. The corresponding group list is used to identify L optional group members. The optional group members and the required group members are combined in step 508, and the halo population process terminates in step 509.

Figure 6:
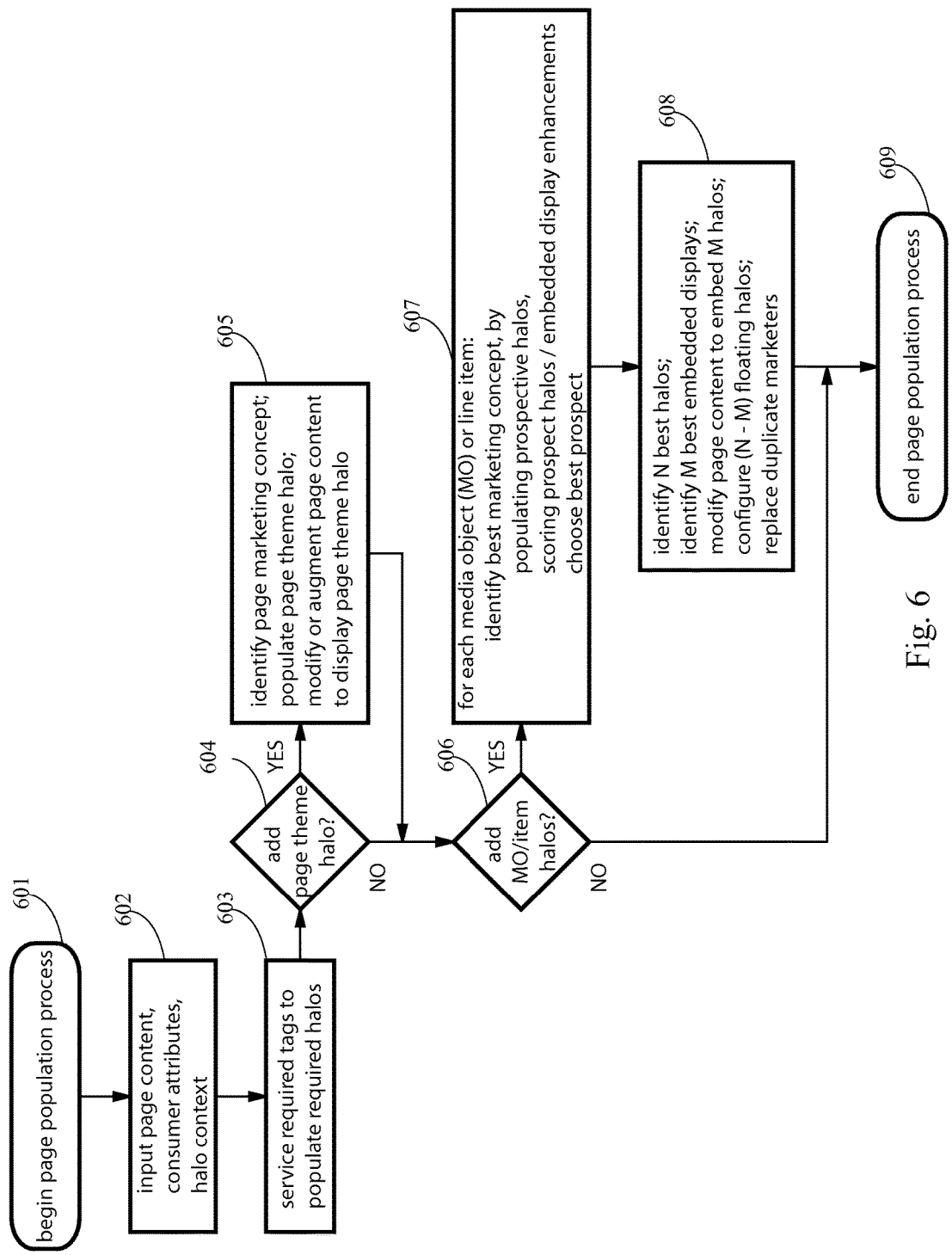
FIG. 6 is an example flowchart for a method of populating a page with halos.

FIG. 6 illustrates an example page population process which augments a page with one or more social halos. The process begins in step 601. In step 602, the process takes in consumer attributes, page content, and halo context. In step 603, the analyzed page content is parsed to process any meta-tags which specify one or more required halo attributes. The required halos are populated using a halo population process such as that shown in FIG. 5. The meta-tags may also specify that a page theme halo is required. A page theme halo may also be indicated as a consumer preference, in response to a consumer action, by default preferences, or by estimating whether a page theme halo score exceeds a minimum threshold. Step 604 checks if a page theme halo should be generated.

If a page theme halo is generated, step 604 proceeds to step 605. In one embodiment, a page theme is determined by page meta-data. In one embodiment, a dominant page theme is determined by analyzing the page content. In an alternative embodiment, prospective marketing themes for the page are compared and a best theme is chosen. For example, in one embodiment, a best theme may be implemented as a theme that generates the most halo service provider revenue. In one embodiment, a number of page themes are analyzed to determine a page theme with the best social marketing benefit.

Step 604 or 605 proceeds to step 606, which checks if there is a possibility of adding halos to one or more media objects or line items. If so step 606 proceeds to step 607. In step 607, each media object or line item is evaluated as a halo prospect. Meta-data in the line item or media object may determine a best marketing concept, or alternatively, a best marketing concept may be determined from the contextual theme of the line item or media object. In one embodiment, meta-data may also remove a line item or media object from active consideration. A prospective halo is populated using a halo population process such as that shown in FIG. 5. Each prospective halo is assigned a social marketing score. In one embodiment, each prospective halo is also scored on the enhancement it provides if embedded in a page display. Social marketing scores are compared to find the best prospect halo for each media object or line item considered.

Proceeding to step 608, the social marketing scores are compared and sorted to find the N best prospect halos. Of these N halos, M are embedded in the page, where M is a non-negative number less than or equal to N. The page enhancement scores are compared and sorted to find the M best halos to embed in the page, and the page content is modified to include the M best embedded halos. The remaining halos are configured as floating or dynamically generated halos. In one embodiment, duplicate advertisers are replaced with substitutes in post-processing. In an alternate embodiment, when an advertiser is assigned to a halo for a consumer, the advertiser is removed from the pool of prospective advertisers for that consumer, so that no duplicates are chosen. The page population process terminates in step 609.

Figure 7:
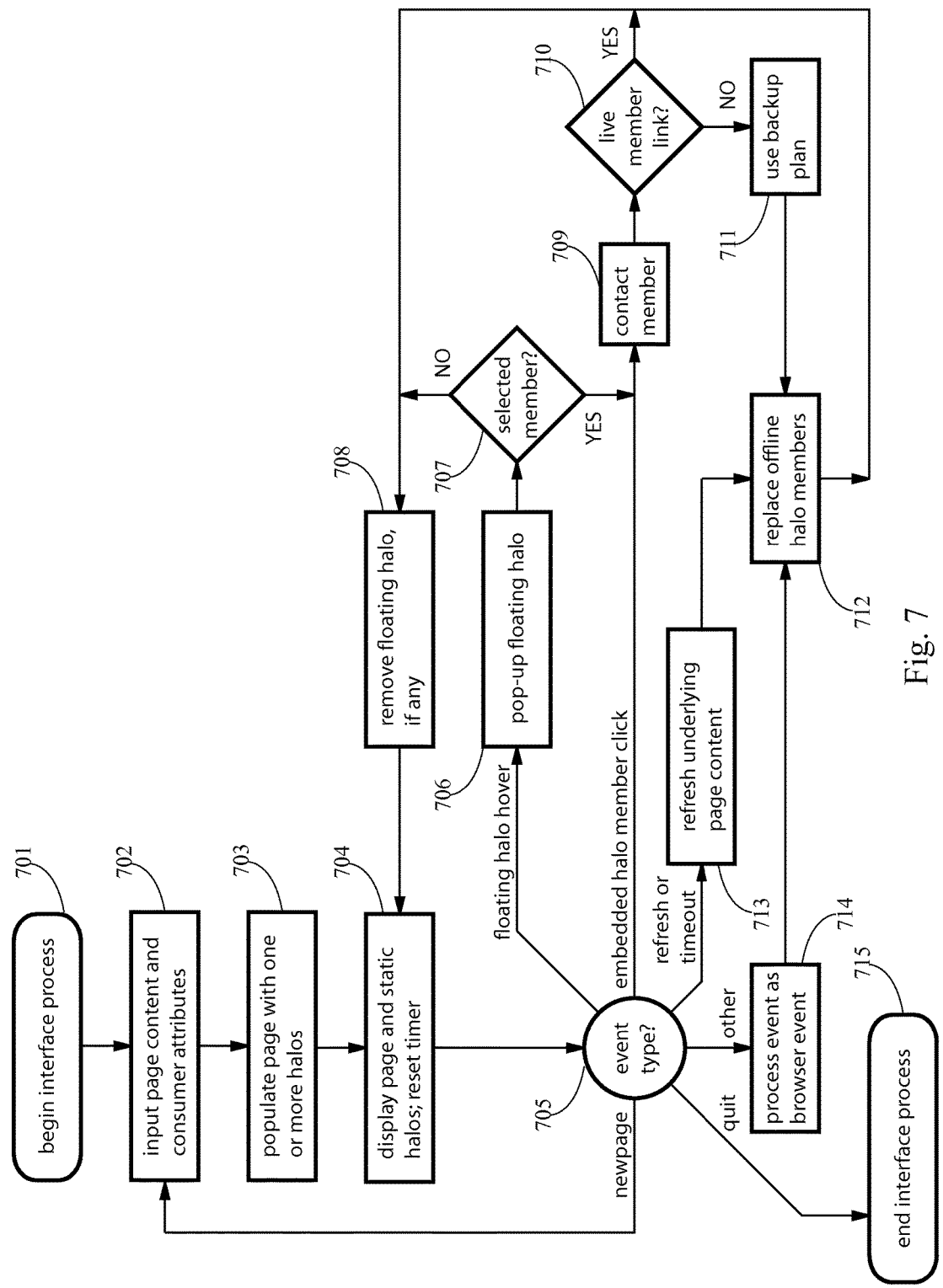
FIG. 7 is an example flowchart for a halo user interface daemon.

The methods indicated in the flowcharts of FIGS. 5-6 are typically, but not necessarily, implemented in network server systems. By contrast, FIG. 7 is a flowchart showing an example interface process typically, but not necessarily, implemented in a consumer's client-side device. Because of firewalls and other intruder/hacker protection measures, a server system may encounter difficulty in pushing content that is not requested to a client-side device. In a preferred embodiment, a client-side process monitors consumer actions and network conditions, and transmits requests to pull additional content from one or more network servers as needed.

An example client side process begins in step 701. In step 702, it is assumed that the consumer has accessed a page of content from a network server or a file system. The page content is input and analyzed, and a stored consumer identifier is accessed. In one embodiment, one or more additional consumer attributes are accessed. In a further embodiment, a server request may contain additional consumer attributes identified by a consumer cookie. In one embodiment, additional consumer attributes stored on the server side may also be accessed. In step 703, a page content identifier and consumer identifier are used to populate the page with one or more halos, using a page population process such as that shown in FIG. 6.

In step 704, the populated page with constantly displayed (static) halos is rendered and displayed on a client-side screen display. A timer is reset to zero to determine the amount of elapsed time since the last rendering of the display. Step 705 is the center of an event loop. The display timer and user interfaces are monitored to detect an event. When an event occurs, step 705 compares the event to an enumerated list of events, and takes the corresponding path in the flowchart. For example, when a consumer cursor or other pointing indicator remains above a media object or line item with a configured floating halo for a pre-determined amount of time, the consumer actions are considered to be performing a "floating halo hover" event, and step 705 proceeds to step 706.

In step 706, a floating halo is rendered on the consumer screen display, preferably as a top layer on top of the underlying display content and in close proximity to the corresponding media object or line item. Further consumer actions are monitored to check if the consumer proceeds to select a floating halo member in step 707. If not, the floating halo (if any) is removed as a top layer in step 708, the page display with static halos is refreshed in step 704, and consumer actions are monitored for a next event in step 705.

If a consumer clicks on a halo member embedded in the page in step 705, or drags and releases a mouse button with a screen cursor over a floating halo member in step 707, the indicated halo member is selected for a marketing contact. In step 709, attempt is made to facilitate contact with the halo member, as, for example, by one of several means as discussed above. If a live communication to the advertiser is established, the process waits in the background in step 710 until the communication is completed and proceeds afterwards to step 708, to remove a floating halo if necessary, as explained above. If a preferred communication link is not established, step 710 proceeds to step 711 to implement a backup communication plan, by, for example, one of several means discussed above. In step 712, any halo members found to be offline in the communication attempt(s) are replaced, and the flowchart proceeds to step 708, as described above.

In step 705, if the elapsed time counter exceeds a threshold, it is assumed that the page content has become stale and needs to be refreshed. A page refresh may also be initiated by an express consumer action, such as by clicking on a browser refresh button. In this case, step 705 proceeds to step 713. In step 713, the underlying page content is refreshed. If the page content is unchanged from a marketing perspective, the previously populated halos are re-used. If not, the page is repopulated with one or more new halos (not shown). Step 713 proceeds to step 712 to replace offline halo members, as described above.

In step 705, monitored consumer actions may indicate a "newpage" event, where the consumer navigates to a different content page, and the flowchart proceeds to step 702 to restart the interface process with the new page content. The consumer may navigate to a new page by, for example, typing a new URL or search phrase in a browser control or clicking on a page link. In step 705, monitored consumer actions may indicate the consumer desires to quit the process. In this case, step 705 proceeds to step 715 where the process terminates. Other events encountered in step 705 are assumed to be browser control events, processed in step 714. After a browser control event is processed, the halo members are refreshed as described above in step 712.

Server systems are typically used to populate a page with one or more marketing halos, to edit and store halo-enabled pages, to maintain a presence system indicating the availability of advertisers, to track consumer attributes and advertiser attributes, to determine halo contexts, to respond to requests for marketing tracking updates, and to manage billing and accounting for marketing plans. Server and client systems described herein can be implemented by a variety of computer systems and architectures.

Figure 8:
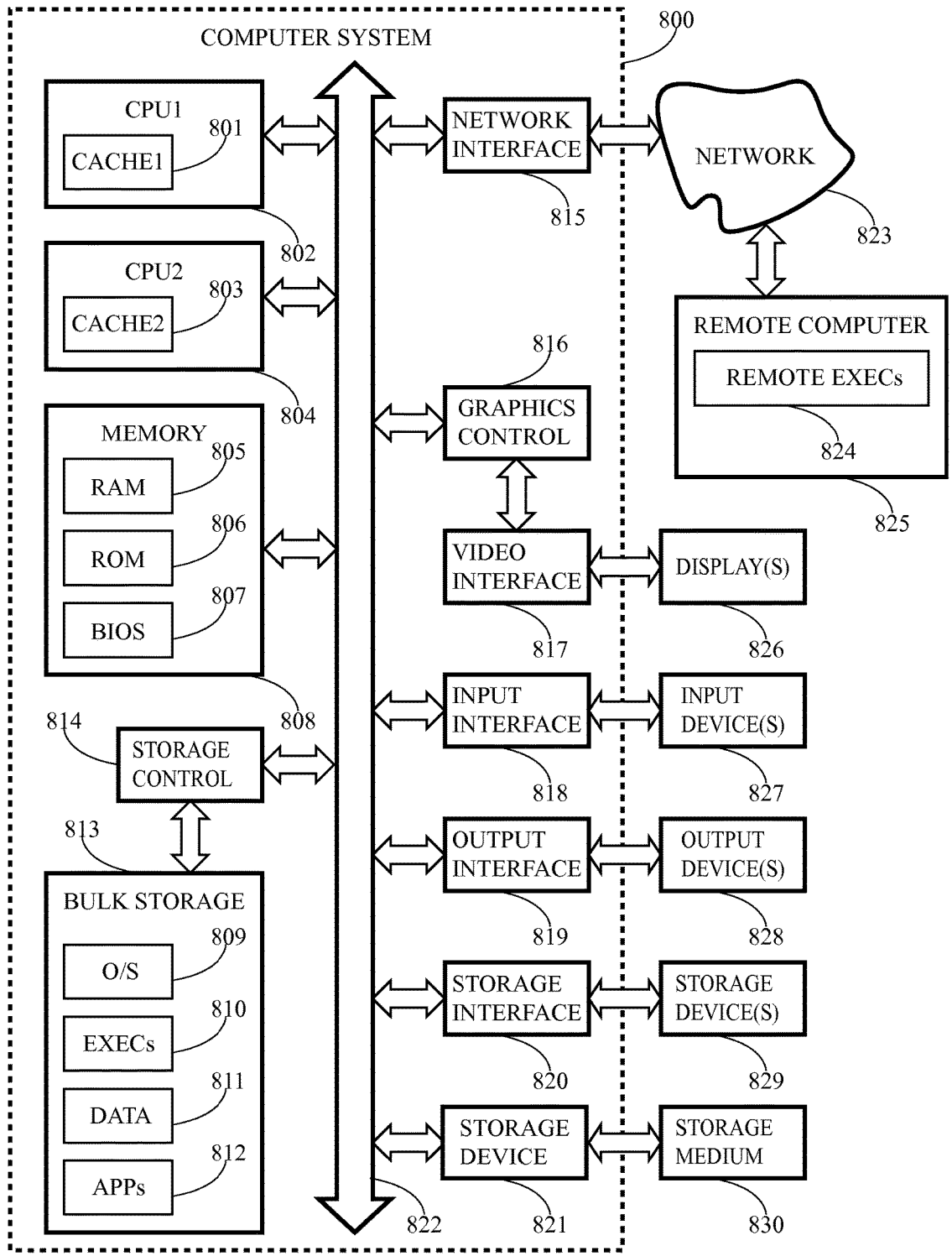
FIG. 8 shows an example of computer server architecture.

FIG. 8 illustrates suitable components in an exemplary embodiment of a general-purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing the invention may include a general-purpose computer system 800. Computer system 800 accesses one or more applications and peripheral drivers directed to a number of functions described herein. Components of the computer system 800 may include, but are not limited to, a CPU or central processing unit 802, a system memory 808, and a system bus 822 that couples various system components including the system memory 808 to the processing unit 802. As used by those skilled in the art, a signal "bus" refers to a plurality of digital signal lines serving a common function. The system bus 822 may be any of several types of bus structures including a memory bus, a peripheral bus, and a local bus using any of a variety of bus architectures. By way of example, and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

An operating system manages the operation of computer system 800, including the input and output of data to and from applications (not shown). The operating system provides an interface between the applications being executed on the system and the components of the system. According to one embodiment of the present invention, the operating system is a Windows® 95/98/NT/XP/Vista/Mobile operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 800 may include a variety of computer-readable media. Computer-readable media can be any available media that can be accessed by the computer system 800 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can be accessed by the computer system 800.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 808 includes computer storage media in the form of volatile and/or nonvolatile memory such as read only memory (ROM) 806 and random access memory (RAM) 805. A basic input/output system 807 (BIOS), containing the basic routines that help to transfer information between elements within computer system 800, such as during start-up, is typically stored in ROM 806 and other non-volatile storage, such as flash memory. Additionally, system memory 808 may contain some or all of the operating system 809, the application programs 812, other executable code 810 and program data 811. Memory 808 typically contains data and/or program modules that are immediately accessible to and/or presently being operated on by CPU 802. Optionally, a CPU may contain a cache memory unit 801 for temporary local storage of instructions, data, or computer addresses.

The computer system 800 may also include other removable/non-removable, volatile/nonvolatile computer storage media. By way of example only, and not by way of limitation, FIG. 8 illustrates a bulk storage 813 that reads from or writes to one or more magnetic disk drives of non-removable, nonvolatile magnetic media, and storage device 821 that may be an optical disk drive or a magnetic disk drive that reads from or writes to a removable, a nonvolatile storage medium 830 such as an optical disk or a magnetic disk. Other removable/non-removable, volatile/nonvolatile computer storage media that can be used in the exemplary computer system 800 include, but are not limited to, magnetic tape cassettes, flash memory cards, digital versatile disks, digital video tape, solid state RAM, solid state ROM, and the like. Bulk storage 813 and the storage device 821 may be connected directly to the system bus 822, or alternatively may be connected through an interface such as storage controller 814 shown for bulk storage 813. Storage devices may interface to computer system 800 through a general computer bus such as 822, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 8, provide storage of computer-readable instructions, executable code, data structures, program modules and other data for the computer system 800. For example, bulk storage 813 is illustrated as storing operating system 809, application programs 812, other executable code 810 and program data 811. As mentioned previously, data and computer instructions in 813 may be transferred to system memory 808 to facilitate immediate CPU access from processor 802. Alternatively, processor 802 may access stored instructions and data by interacting directly with bulk storage 813. Furthermore, bulk storage may be alternatively provided by a network-attached storage device (not shown), which is accessed through a network interface 815.

A user may enter commands and information into the computer system 800 through the network interface 815 or through an input device 827 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 802 through an input interface 818 that is coupled to the system bus, but may be connected by other interface and bus structures, such as a parallel port, a game port or a universal serial bus (USB). A display 826 or other type of video device may also be connected to the system bus 822 via an interface, such as a graphics controller 816 and a video interface 817. In addition, an output device 828, such as headphones, speakers, or a printer, may be connected to the system bus 822 through an output interface 819 or the like.

The computer system 800 may operate in a networked environment using a network 823 to one or more remote computers, such as a remote computer 825. The remote computer 825 may be a terminal, a personal computer, a server, a router, a network PC, a peer device or other common network node, and typically includes many or all of the elements described above relative to the computer system 800. The network 823 depicted in FIG. 8 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not by way of limitation, FIG. 8 illustrates remote executable code 824 as residing on remote computer 825. It will be appreciated that the network connections shown are exemplary and other means of establishing a communications link between the computers may be used.

Collectively, these elements are intended to represent a broad category of computer systems, including but not limited to general purpose computer systems based on one or more members of the family of CPUs manufactured by Intel Corporation of Santa Clara, Calif., the family of CPUs manufactured by Advanced Micro Devices (AMD), Inc., of Sunnyvale, Calif., or the family of ARM CPUs, originally designed by Advanced RISC Machines, Ltd., as well as any other suitable processor. Of course, other implementations are possible. For example, the server functionalities described herein may be implemented by a plurality of server sub-systems communicating over a backplane.

Various components of computer system 800 may be rearranged, deleted, or augmented. For example, system bus 822 may be implemented as a plurality of busses interconnecting various subsystems of the computer system. Furthermore, computer system 800 may contain additional signal busses or interconnections between existing components, such as by adding a direct memory access unit (not shown) to allow one or more components to more efficiently access system memory 808.

As shown, CACHE1 and CPU1 are packed together as "processor module" 802 with processor CPU1 referred to as the "processor core." Alternatively, cache memories 801, 803, contained in 802, 804 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 800 may include additional components, such as one or more additional central processing units, such as 804, storage devices, memories, or interfaces. In addition, one or more components of computer system 800 may be combined into a specialized system-on-a-chip (SOC) to further system integration. In some computer system environments where component count is critical, the entire computer system may be integrated in one or more very large scale integrated (VLSI) circuit(s).

As discussed below, in one implementation, operations of one or more of the physical server or client systems described herein is implemented as a series of software routines executed by computer system 800. Each of the software routines comprises a plurality or series of machine instructions to be executed by one or more components in the computer system, such as CPU 802. Initially, the series of instructions may be stored on a storage device, such as bulk storage 813. However, the series of instructions may be stored in an EEPROM, a flash device, or a DVD. Furthermore, the series of instructions need not be stored locally, and could be received from a remote computer 825 or a server on a network via network interface 815.

Figure 9:
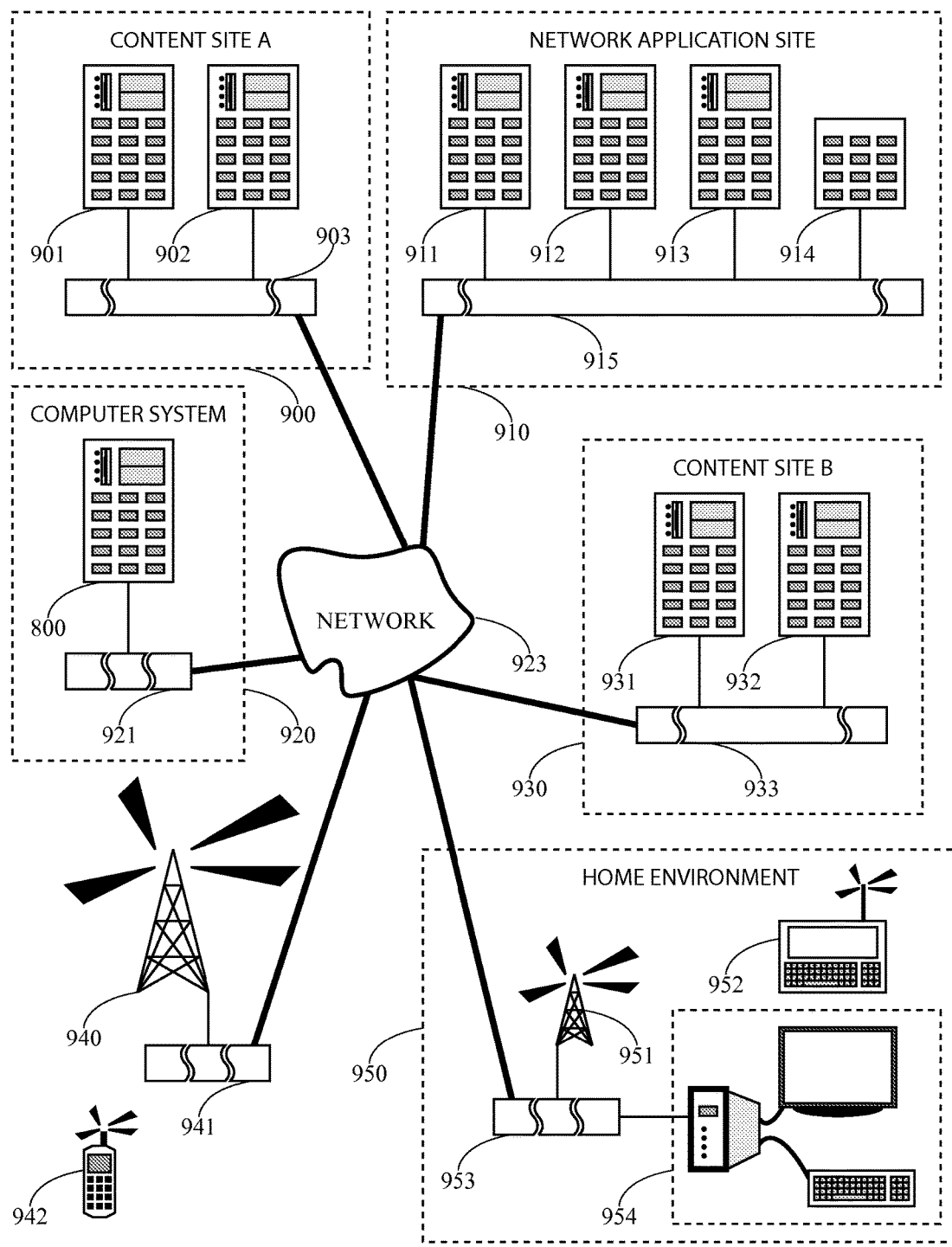
FIG. 9 shows an example of a social networking environment.

FIG. 9 illustrates computer system 800 placed in an example wide area network environment, such as the Internet. Network cloud 823 generally represents one or more interconnected networks, connecting computer system 800, a plurality of example network sites, 900, 910, 920, 930, 940, and 950, and a plurality of example client devices, 942, 951, 952, and 954. Network cloud 823 may include TCP/IP based wide area networks, private networks, wireless networks, satellite networks, cellular networks, paging networks, and the like. Client systems, such as portable device 942, portable computer 952, and personal computer 954 are operably connected to the wide area network environment through an internet service provider (not shown), a cellular provider 940, a wireless provider (not shown), a local wireless network 951, and/or a local wired network 953.

Computer system 800 is contained within the network site 920, where one or more computer systems, such as computer system 800, are connected to a local area network and router 921. The router 921 manages local computer communication traffic in network site 920 and interconnects with network cloud 823. Router 921 also functions to translate one or more local area network addresses in network site 920 to provide one or more unique corresponding wide area network addresses in order to facilitate communication between computer systems in network site 920 and other computer systems on the wide area network.

FIG. 9 illustrates a number of network service provider sites, including content site A 900, content site B 930, and network application site 910. The described invention may operate with one or more content providing or application sites. Although FIG. 9 illustrates the provider sites as separate local network sites, the functionality of each site may be combined with other sites. Further, a function for a particular site may be performed in a distributed computing environment by one or more computer systems at remote sites. Further still, the functionality represented by each depicted site may be further separated into a plurality of sub-function sites. In addition, implementations of the invention may operate in network environments that include multiples of one or more of the individual sites or subsystems of sites described herein. Implementations of the invention may also operate in network environments where one of more of the systems or sites described herein has been eliminated.

Content aggregation sites are represented by content site A 900 and content site B 930 in FIG. 3. Content is stored as one or more digital data objects. A digital data object may include one or more media objects or executable code objects. Content site A 900 is a network addressable system that allows users to access media objects supplied by one or more users. In one implementation, content site A 900 may be a media object aggregation or sharing system, such as the Yahoo! Geocities® blog-sharing site, and similar variants. Content site A 900 comprises one or more physical server systems 901, 902, implemented using an architecture such as that of computer system 800, and containing or connected to one or more bulk storage systems, such as that of bulk storage system 813, or a network attached storage device (not shown), and a local area network and router 903. The one or more physical servers allow users to upload and download media objects. In one implementation, the functionality hosted by the one or more physical servers may include web or HTTP servers, FTP servers, and the like.

Content site B 930 is a network addressable system that allows users to access content supplied by one of more content suppliers (not shown). Content site B 930 comprises one or more physical server systems 931, 932 containing or connected to one or more bulk storage systems (not shown), and a local area network and router 933.

Network application site 910 is a network addressable system that allows users to access one or more executable code objects supplied by one or more service providers (not shown). Network application site 910 comprises one or more physical server systems 911, 912, 913 containing or connected to one or more bulk storage systems, shown as network-attached storage device 914, and a local area network and router 915. Executable code objects may include code to be executed on a client device as well as code executed within a server system, such as server 912. An example of an executable code object is an informational web site where users request and receive identified web pages and other content over the network cloud 823. The executable code object may also be a posting forum, where users may submit or otherwise configure media objects to be perceived by other users. The executable code object may also be a social network application, such as a chat client or e-mail client, adapted to establish intermediated or peer-to-peer communications with other clients. The executable code object may also be a web-posting application, allowing users to configure and maintain personal web pages. One or more executable code objects may also combine to form a content distribution application that displays available media objects and transmits them to users. Examples of network application sites include Yahoo! Music Engine®, Apple iTunes®, and podcasting servers.

Network application site 910 and sites 900, 930 also represent a suitable architecture for invention. As stated above, server systems are used to populate a page with one or more marketing halos, to edit and store halo-enabled pages, to maintain a presence system indicating the availability of advertisers, to track consumer attributes and advertiser attributes, to determine halo contexts, to respond to requests for marketing tracking updates, to manage billing/accounting for marketing plans, to adapt attributes, and to facilitate and/or log communications between a consumer and an advertiser. One suitable configuration allocates site 900 for common consumer accesses. For example, site 900 may comprise a consumer site, where server 901 performs as a halo-enabled object server and server 902 may track consumer access to halo-enabled objects and consumer attributes. Site 930 may comprise a marketing site, where advertisers store attributes and generate/edit halo-enabled web pages in advertiser server 931, and a service provider manages marketing accounts in billing server 932. Network application site 910 may comprise a population server, with a populating server 911, an advertiser presence server 912, and a communications server 913. Other arrangements and assignments of the social marketing functions are possible.

In the context of a computer network, a "virtual server" is physically one or more server systems connected to the network and support circuitry to execute application programs for processing data. Data may be stored by means which facilitate efficient processing, such as by storing the data in a "database" consisting of a collection of data organized by relationships between the various forms of data contained therein. When a virtual server consists of more than one computer server system, the set of computer server systems is interconnected hierarchically to perform high-level functions as combined functions of several servers under central control.

Functionally, a virtual server executes a sequence of low-level CPU commands to complete instructions for processing data. A virtual server typically accepts instructions and executes commands for a multitude of "clients". The instructions may include, but are not limited to, instructions to store or retrieve data, to modify, verify or erase data, or to reorganize data. A virtual server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The music server may therefore also be a client of other servers. Practitioners of the art will recognize that virtual servers and clients are abstract interactive devices controlled by software instructions, whose interaction protocols may be flexibly defined. A "client" as used herein may include functionally to process information and programs, as well as to issue commands. Similarly, a virtual server as used herein may include functionally to initiate commands to users and other servers as well as to respond to instructions.

Similarly, a database should not be construed to be a single physical collection of data. As used herein, a database is an abstract collection of data which may be distributed over one or more physical locations. Said data may be stored physically within a single or multiple servers, within attached physical device(s), network attached device(s), or user devices(s). Similarly, an application program should not be construed to be a single physical collection of commands. As used herein, an application program is an abstract collection of CPU commands, which may be physically executed, in whole or in part, within a single or multiple servers, within attached physical devices(s), within network attached device(s), or within user device(s).

An example of a less conventional social network marketing interface is shown in FIGS. 10-11, which depict four consecutive steps in use of the interface, denoted FIGS. 10A, 10B, 11A, and 11B, respectively. In these figures, a typical portable client-side device 1000 includes a keypad 1004 and a pointing means. In one embodiment, the pointing means is provided by a four-position rocker switch, with up arrow 1002, down arrow 1003, left arrow 1008 and right arrow 1012. In an alternate or augmented embodiment, a pointing means is provided by a screen sensitive to touch, known as a touch-screen. As shown in FIG. 10A, the consumer may access different scrolling pages of advertisements pressing the up/down switches 1002-1003, or with a touch-screen, by touching a media object and dragging it up or down. An advertisement 1001 for a mobile phone known as the RAZR®, manufactured by Motorola, Inc., is scrolling into view in FIG. 10A. In FIG. 10B, the advertisement 1001 occupies a full advertising page on the device. Because the advertisement is a halo-enabled object, a marketing halo appears, represented by title 1005, left halo scroll indicator 1006, left-hand member 1007, center member 1009, right-hand member 1011, and right halo scroll indicator 1010. Center halo member 1009 is selected as a default advertiser. If the consumer activates an assigned selection control, the default advertiser is selected. The selection control may be implemented by various means, such as by pressing the center of the rocker switch, pushing a designated button, or tapping on the image in a touch-screen. If the consumer desires a different default advertiser, the consumer may scroll the halo display leftward using the left arrow button 1008 or touching 1006 on a touch-screen, or rightward using the right arrow button 1012 or touching 1010 on a touch-screen. When the consumer pushes 1008 for example, image 1009 is shrunk to replace image 1007, image 1011 is enlarged and replaces 1009, and a new halo member is depicted in the space formerly occupied by 1011.

In FIG. 10C, the consumer has acted to request additional information about the default advertiser depicted in 1009. In a preferred embodiment, the default advertiser is an advertiser in the set of halo members with the most social marketing benefit. The request may be indicated by holding a finger or stylus on the image 1009 in a touch-screen, or by pressing an information or help button. In a response similar to FIG. 2's pop-up window 206-207, a pop-up window with elements 1101 (advertiser title), 1102 (advertiser affiliation) and redundant indicators 1103, 1104 for means of communication with the advertiser appear. In a preferred embodiment, the consumer drags a touch-screen pointer to the pop-up window to initiate communication by the default means.

In one embodiment, the consumer may initiate a communication by tapping or otherwise selecting the default advertiser image without requesting additional information about the advertiser. In one embodiment, a consumer may initiate communications by displaying communication options and selecting a communications means, such as by displaying the pop-up information window and touching 1103 or 1104 on a touch-screen.

Finally, in FIG. 11B, the default communication is initiated by calling advertiser Lynn, and the halo display process is put in the background while the communication is completed. In a preferred embodiment, a communication status display shows one or more attributes of the communication, such as, for example, an icon for the means of communication, 1105, text explaining the status of the communication 1106, and an image for the advertiser 1009. In one embodiment, the means of communication is by video chat, and instead of displaying a static image of the advertiser, a streaming video image of the advertiser is displayed instead.

FIG. 11B also illustrates an additional or alternative embodiment of the user interface. In this interface, a cursor is displayed on the video screen, such as exaggerated cursor 1108. For example, after the marketing call to Lynn is initiated, display of a cursor pointing to the product may be used to indicate that a sale may be completed by a consumer action such as the activation of a keyboard button.

In an alternative interface embodiment, the cursor 1108 provides an indicator of a selection means similar to that of a mouse cursor on a computer screen. The cursor location is moved via navigational switches, such as 1002-1003 of FIG. 10A for up/down motion, and 1008, 1012 of FIG. 10B for left/right motion. In FIG. 11B, button 1107 may be configured, for example, as an "INFO" button. Activation of INFO button 1107 while the cursor is above an image of Lynn might display the pop-up window 1101-1104 of FIG. 11A for example. Button 1109 may also be configured, for example, as a "SELECT" button. Activation of SELECT button 1109 while the cursor is above an image of Lynn might initiate the call to Lynn as shown in FIG. 11B, for example.

By delivering a user-specific halo of people connected to the user and related to the products or services the user encounters as he moves through a network, the user experience is personalized with increased efficiency of consumer research and purchasing decision making.

From the perspective of media object creators and publishers, the halo system offers an additional advertising and/or personalization opportunity related to their objects or inventory that allows detailed, real-time explanation, question/answer sessions, or other user interest-based knowledge transfer between two or more live humans related to the media object or subject/advertiser.

From the advertising delivery network perspective, the present invention creates a new advertising channel to monetize human to human interactions related to existing published advertisements by populating a real-time, socially-appropriate communications network of users willing to act as advocates or advertiser-representatives with regards to specific products, services, interests or actual media objects.

By leveraging the network of engaged users, their relations and interests and appropriate economic incentive models, the halo system delivers social media marketing to users that is timely and relevant while providing advertisers another channel of sales support and publishers another monetization opportunity.

The description above sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the means used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers to be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising:
receiving, via a computing device, a search request for content from a client device;
generating, by the computing device, a user interface, said user interface comprising a dynamic web page constructed in response to said search request and including
at least one media object, each media object representing an entity associated with the subject matter of the search request;
identifying, by the computing device, a halo context associated with the dynamic web page;
populating, by the computing device, a halo with a plurality of augmenting objects, each augmenting object associated with a communications channel and an advocate, the populating performed based on the halo context;
calculating, by the computing device, a social connection score for the halo based on the geographic locations of each of the advocates populated in the halo with respect to a geographic location of the user of the client device;
calculating, by the computing device, a benefit score for the halo based on a plurality of ratings of each of the advocates with respect to the entity represented by the media object;
identifying, by the computing device, that the halo should be displayed on the dynamic webpage if the social connection score and the benefit score exceed respective thresholds;
augmenting, by the computing device, the dynamic web page with the halo by positioning the halo around the at least one media object and embedding a script within the dynamic web page associated with the at least one media object, the execution of the script by the client device causing the establishment of at least one activatable communication channel with one of the advocates.

2. The method of claim 1, the advocates represented by each of the plurality of augmenting objects being socially connected to a user initiating the search request.

3. The method of claim 2, a social connection between an advocate and the user comprising one selected from the group consisting of ethnicity, age, sex, educational level, educational institutions, economic class, profession, geographic area, expressed user preferences, derived user preferences, and membership in a demographic group.

4. The method of claim 1, each of the augmenting objects being displayed near the media object with whose entity the advocate represented by the halo is associated.

5. The method of claim 4, at least one augmenting object in the plurality of augmenting objects being displayed statically, such that the at least one augmenting object is always visible to the user when the dynamic web page is displayed.

6. The method of claim 4, at least one augmenting object in the plurality of augmenting objects being displayed dynamically, such that the at least one augmenting object is only visible to the user when the user interacts with the at least one media objects.

7. The method of claim 1, at least one augmenting object in the plurality of augmenting objects displayed in a location selected from the group consisting of a left drawer, a right drawer, a bottom drawer, a left sidebar, a right sidebar, a bottom bar, a toolbar, a tear-off window, a pop-up window, a tabbed window, and a pop-up menu list.

8. The method of claim 1, the activation of an activated augmenting object in the plurality of augmenting objects initiating communication between the user and the advocate represented by the activated augmenting object.

9. The method of claim 1, each of the plurality of augmenting objects further including an affiliation between the advocate represented by the halo and the entity with which the advocate is associated.

\* \* \* \* \*